(12) United States Patent
Middlemiss et al.

(10) Patent No.: US 10,668,539 B2
(45) Date of Patent: Jun. 2, 2020

(54) GRAPHITE HEATER WITH TAILORED RESISTANCE CHARACTERISTICS FOR HPHT PRESSES AND PRODUCTS MADE THEREIN

(71) Applicant: Smith International, Inc., Houston, TX (US)

(72) Inventors: Stewart Middlemiss, Salt Lake City, UT (US); Ronald Eyre, Orem, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 781 days.

(21) Appl. No.: 14/936,682

(22) Filed: Nov. 10, 2015

(65) Prior Publication Data

US 2016/0129504 A1   May 12, 2016

Related U.S. Application Data

(60) Provisional application No. 62/077,718, filed on Nov. 10, 2014.

(51) Int. Cl.
| | |
|---|---|
| *B22F 3/15* | (2006.01) |
| *B23B 27/14* | (2006.01) |
| *C22C 26/00* | (2006.01) |
| *B22F 3/14* | (2006.01) |
| *B22F 5/00* | (2006.01) |

(52) U.S. Cl.
CPC .............. *B23B 27/148* (2013.01); *B22F 3/14* (2013.01); *C22C 26/00* (2013.01); *B22F 2005/001* (2013.01); *B22F 2999/00* (2013.01); *C22C 2026/006* (2013.01)

(58) Field of Classification Search
None
See application file for complete search history.

(56) References Cited

U.S. PATENT DOCUMENTS

| | | | |
|---|---|---|---|
| 5,858,525 A | 1/1999 | Carter et al. | |
| 9,643,373 B1 * | 5/2017 | Bertagnolli | ............ B30B 15/34 |
| 9,739,097 B2 | 8/2017 | Zhang et al. | |

(Continued)

FOREIGN PATENT DOCUMENTS

CN   102019154 A   4/2011

OTHER PUBLICATIONS

Product Data Sheet—Iso-statically Pressed Graphite (Iso-graphite) series from Ceramaterials. Web availability Oct. 15, 2014, http://web.archive.org/web/20141015073840/http://ceramaterials.com/machinedgraphite.html.*

(Continued)

*Primary Examiner* — Matthew J Daniels
*Assistant Examiner* — Mohammad M Ameen

(57) ABSTRACT

A method for sintering includes loading a tool material into a resistance heating element within a HPHT press and heating the resistance heating element at a first axial portion to a control temperature, where a temperature difference is measured between the control temperature and a second temperature measured at a distal axial portion along the resistance heating element, wherein a difference between the control temperature and the second temperature ranges between about 5 percent to about 11 percent of the control temperature.

19 Claims, 10 Drawing Sheets

(56) References Cited

U.S. PATENT DOCUMENTS

| | | | |
|---|---|---|---|
| 2003/0183155 A1* | 10/2003 | D'Evelyn | B82Y 10/00 |
| | | | 117/68 |
| 2009/0152018 A1 | 6/2009 | Sani | |
| 2009/0166094 A1 | 7/2009 | Keshavan et al. | |
| 2010/0108403 A1 | 5/2010 | Keshavan | |
| 2013/0168159 A1* | 7/2013 | Eyre | E21B 10/46 |
| | | | 175/432 |
| 2014/0109491 A1 | 4/2014 | Voronin et al. | |
| 2014/0110180 A1 | 4/2014 | Yu | |
| 2014/0262539 A1* | 9/2014 | DiGiovanni | B24D 18/0009 |
| | | | 175/428 |

OTHER PUBLICATIONS

International Search Report and Written Opinion issued in International Patent application PCT/US2015/059882 dated Feb. 19, 2016. 11 pages.

International Preliminary Report on Patentability issued in International Patent application PCT/US2015/059882, dated May 16, 2017. 7 pages.

First Office Action and translated Search Report issued in Chinese Patent Application 2015800697102 dated Oct. 9, 2018, 7 pages.

* cited by examiner

GRAPHITE HEATER WITH TAILORED RESISTANCE CHARACTERISTICS FOR HPHT PRESSES AND PRODUCTS MADE THEREIN

CROSS-REFERENCE TO RELATED APPLICATIONS

This application claims priority to U.S. Patent Application No. 62/077,718, filed on Nov. 10, 2014, which is herein incorporated by reference in its entirety.

BACKGROUND

High pressure, high temperature ("HPHT") sintering processes include using a high-pressure press, such as a cubic press, a belt press, or a toroid press, to subject a material or material mixture to high pressure and high temperature conditions. The material may be held within a container that is placed inside the press, where both the material and the container are subjected to HPHT conditions. The container should be sufficiently deformable to transmit pressure to the material being pressed, but must also be strong enough to seal the central compartment in which the material being sealed is held so that high pressure can be developed within the central compartment. In some processes, an insulating sleeve, made of a low thermal conductivity material, is assembled between the container and the material being pressed to reduce heat dissipation through the container.

When used to sinter ultra-hard materials, such as polycrystalline diamond (PCD) and polycrystalline cubic boron nitride (PCBN), a high-pressure press may apply pressures in the range of 5 to 8 GPa and temperatures in the range of 1300 to 1650° C. Some processes may include sintering the ultra-hard material to a substrate, such as a carbide substrate, for example, during a single sintering process for forming the ultra-hard material body and bonding the ultra-hard material body to the substrate, or using separate sintering processes for forming the ultra-hard material body and bonding the ultra-hard material body to a substrate. However, some materials may be pressed under a pressure of greater than 8 GPa and a temperature greater than 1650° C. For example, a binderless nano-polycrystalline PCD material may be sintered in a high-pressure press at a pressure of about 15 GPa and a temperature of about 2300° C.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for sintering that includes loading a tool material into a resistance heating element within a HPHT press and heating the resistance heating element at a first axial portion to a control temperature, where a temperature difference is measured between the control temperature and a second temperature measured at a distal axial portion along the resistance heating element, wherein a difference between the control temperature and the second temperature ranges between about 5 percent to about 11 percent of the control temperature.

In another aspect, embodiments disclosed herein relate to a method for sintering, that includes loading a tool material into a resistance heating element within a HPHT press; and heating the resistance heating element at a first axial portion to a control temperature, where a temperature difference is measured between the control temperature and a second temperature measured at a distal axial portion along the resistance heating element, the second temperature having a standard deviation of less than about 15 percent between runs.

In another aspect, embodiments disclosed herein relate to a cutting element having an ultra hard material body that includes a plurality of hard grains and a binder phase substantially uniformly distributed among the plurality of hard grains, such that the volume percent of the binder phase measured around a perimeter of the ultra hard material body varies within 15 percent of the average volume percent of the binder phase around the perimeter.

In yet another aspect, embodiments disclosed herein relate to an HPHT cell assembly that includes a substantially tubular resistance heating element having a fine grain size ranging from about 5 micrometers to about 30 micrometers.

Other aspects and advantages of the claimed subject matter will be apparent from the following description and the appended claims.

DETAILED DESCRIPTION

Embodiments disclosed herein relate generally to HPHT press components having tailored resistance characteristics and the products made therein, for example, cutting elements used in downhole drilling applications. By using one or more components of a HPHT cell having tailored resistivity, a desired temperature gradient may be created in the HPHT cell. According to some embodiments of the present disclosure, a controlled temperature gradient in a HPHT cell may be used to sinter a cutting element having improved material composition uniformity.

Figure 1:
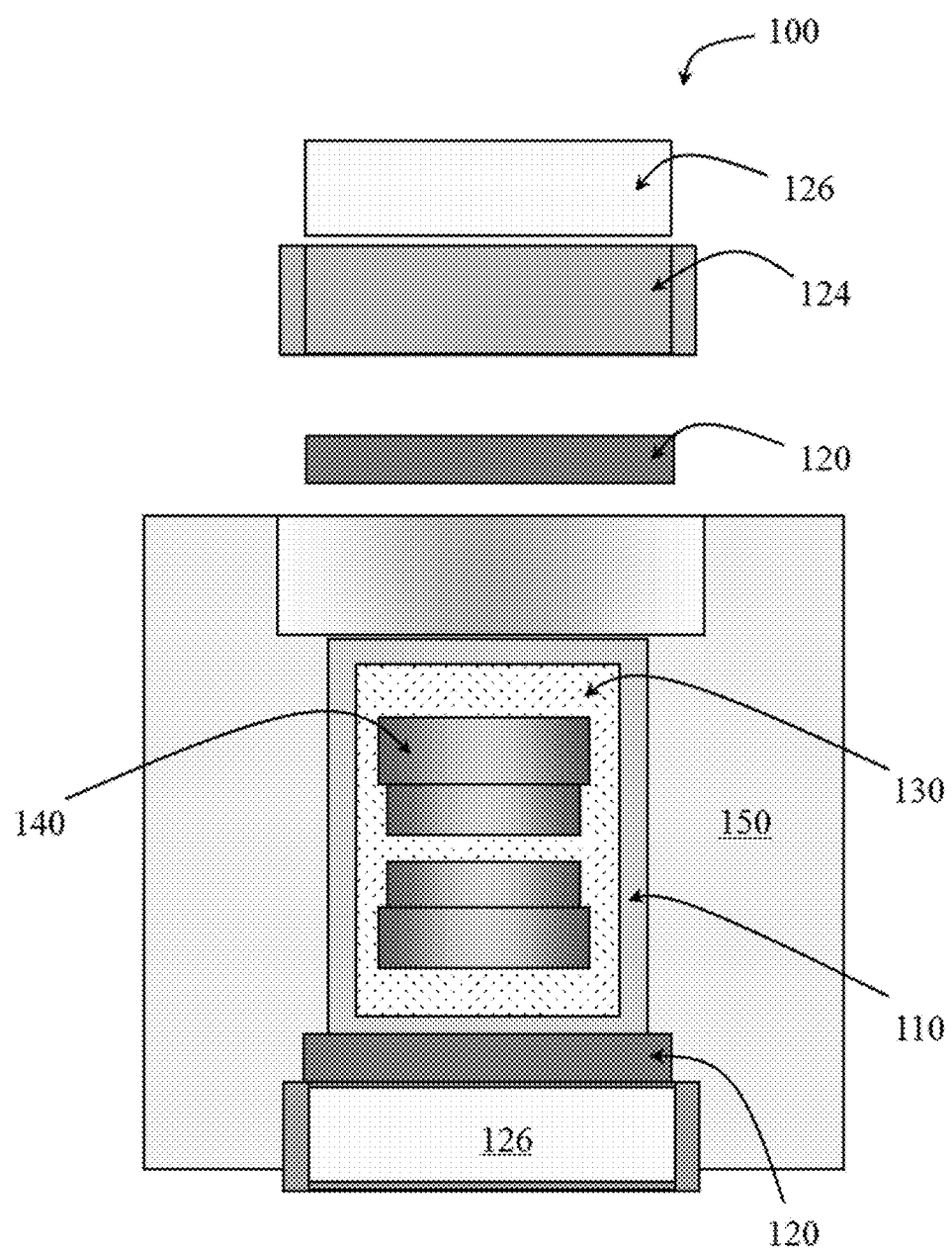
FIG. 1 is a cross sectional view of a HPHT cell assembly according to embodiments of the present disclosure.

FIG. 1 shows an example of components of a HPHT cell assembly 100 having a substantially tubular resistance heating element 110 and end disks 120 fitted at each axial end of the heating element 110, each end disk assembled to the resistance heating element 110 with a current ring 124 and button 126. A pressure transmitting material 130 may be disposed between the heating element 110 and the tool material 140 being sintered. A gasketing material 150 may encapsulate the resistance heating element 110.

Figure 2:
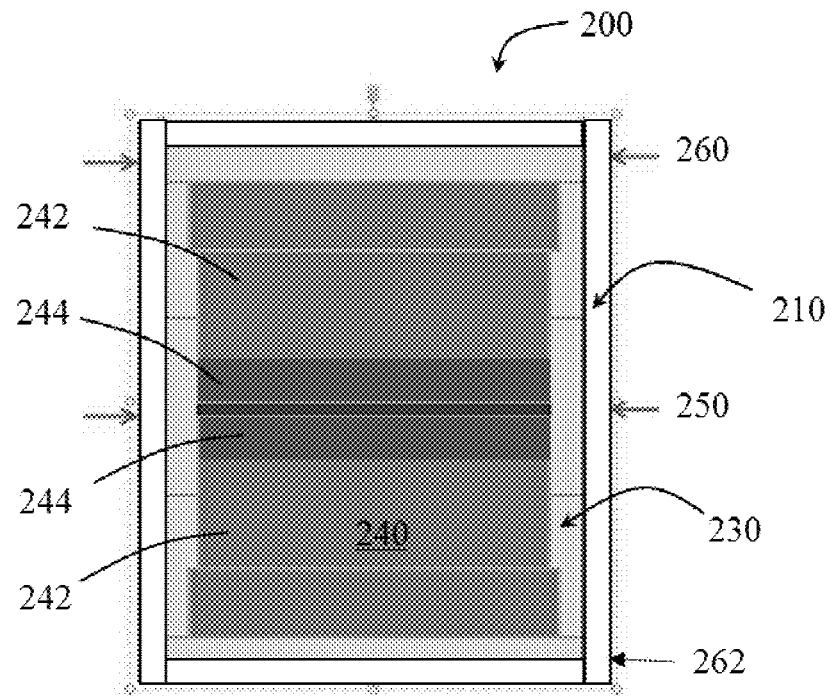
FIG. 2 is a cross sectional view of a HPHT cell assembly according to embodiments of the present disclosure.
Figure 3:
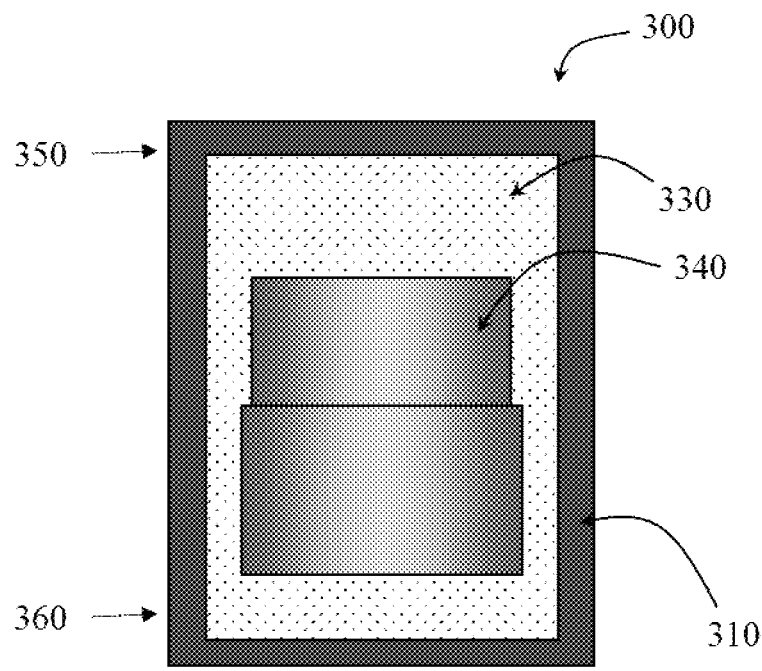
FIG. 3 is a cross sectional view of a HPHT cell assembly according to embodiments of the present disclosure.

FIGS. 2 and 3 show examples of product enclosures 200, 300 having a tool material 240, 340 to be sintered loaded into a resistance heating element 210, 310 of a reaction cell. A pressure transmitting material 230, 330 may be disposed between the heating element 210, 310 and the tool material 240, 340 to be sintered. In the embodiment shown in FIG. 2, tool material 240 for forming two cutting elements is loaded into the resistance heating element 210, including a substrate material 242 and diamond powder 244, or other ultra hard material. Substrate material 242 may include a transition metal carbide, such as tungsten carbide. In the embodiment shown in FIG. 3, tool material 340 for forming one cutting element is loaded into the resistance heating element 310. Other embodiments may have more than two products sintered within a HPHT reaction cell according to embodiments of the present disclosure.

Pressure transmitting material may include material that is thermally and chemically stable at high pressure and temperatures conditions. For example, pressure transmitting material may include a salt, a carbide, a nitride, a boride, an oxide, graphite, and combinations thereof, such as at least one of sodium chloride, sodium iodide, sodium bromide, potassium chloride, potassium iodide, potassium bromide, calcium chloride, calcium iodide, calcium bromide, boron nitride, boron carbide, magnesium oxide, calcium oxide, and mixtures thereof.

Suitable materials for forming a component of a high pressure press may include, for example, at least one of a ceramic material, minerals, graphite, a thermally insulating material, a gasketing material, a conductive material and combinations thereof. For example, a composite material including a clay mineral powder and at least one type of ceramic material or hard material may be used to form at least a portion of a component for a high pressure press. Suitable clay or clay-like phyllosilicate minerals may include akermanite ($Ca_2MgSi_2O_2$), betrandite ($Be_2Al_2Si_6O_{16}$), kaolinite (($Al_4Si_6)_{10}(OH)_8$), montmorillonite $(Na, Ca)_{0.33}(Al, Mg)_2(Si_4O_{10})(OH)_2 \cdot n(H2O)$, pyrophylite ($Al_4Si_4O_{10}(OH)_2$), rehnite (($Ca_2Al_2Si_3O_{10}(OH)_2$), scolecite ($CaAl_2Si_2O_1 \cdot 3H_2O$), serpentine ($Mg_3Si_2O_5(OH)_4$), high alumina talc, low alumina talc, zoisite ($Ca_2Al_3Si_3O_{12}(OH)_2$) and the like. Examples of ceramic material that may be used include but are not limited to silica ($SiO_2$), alumina ($Al_2O_3$), iron oxide ($Fe_3O_4$), silicon carbide (SiC), silicon nitride ($Si_3N_4$), zirconia ($ZrO_2$) and the like. Examples of useful hard minerals may include pyrope ($Mg_3Al_2Si_3O_{12}$), corundum (Al2O3), zircon ($ZrSiO_4$), kayanite ($Al_2SiO_5$), olivine ($(Mg, Fe)_2SiO_4$), enstatite (MgSiO3) and similar minerals. Other suitable materials for forming a component of the present disclosure may be found, for example, in U.S. Pat. No. 5,858,525, which is incorporated herein by reference.

According to embodiments of the present disclosure, a reaction cell of a HPHT press may be designed to have a varied distribution of heat along an axial dimension. For example, a reaction cell of a HPHT press may be designed to provide a selected temperature gradient from a first axial position to one or both axial ends of the reaction cell during high pressure high temperature sintering. Design of the reaction cell may include varying, for example, the dimensions (e.g., wall thickness and width) and/or the material properties of one or more components of the reaction cell.

For example, according to embodiments of the present disclosure, a resistance heating element may be designed to have a tubular shape, including a selected inner diameter and a selected wall thickness. The thickness of a pressure transmitting material disposed between the resistance heating element and the tool material being sintered may be varied depending on, for example, the selected inner diameter of the resistance heating element and the size of the tool component being sintered.

According to some embodiments, the material properties of at least one component of a reaction cell, e.g., a resistance heating element and/or end disks, may be varied to provide a desired temperature gradient within the reaction cell while also having sufficient strength to withstand high pressure and high temperature conditions. For example, a resistance heating element may be formed of a graphite composition having a fine grain size and/or a monomodal grain size distribution. A fine grain size may include a grain size ranging from a lower limit selected from 5, 10 or 15 micrometers to an upper limit selected from 20, 30 or 50 micrometers, where any lower limit may be selected in combination with any upper limit. For example, a resistance heating element may be formed of graphite having a fine grain size ranging from about 5 micrometers to about 30 micrometers in some embodiments, and from about 10 micrometers to about 20 micrometers in some embodiments. Fine grain sizes of graphite reaction cell components may be selected to reduce orientation effects resulting from coarse grain sizes, e.g., grain sizes greater than about 500 micrometers.

A reaction cell component according to embodiments of the present disclosure may be designed to have a composition with low variability, for example, a monomodal grain size distribution and/or uniform porosity or inclusion distribution. In some embodiments, a reaction cell component may have a material composition designed and controllably formed, for example, by additive manufacturing, such as 3D printing, robot casting, or simultaneous casting. In such embodiments, components for use in a high pressure press may be made by successively depositing a volume of one or more materials to build a three dimensional body of the component, where at least two depositions of adjacent volumes have the same material composition. For example, a component made from additive manufacturing processes may be made by depositing multiple layers to build the component geometry, each layer made of or including one or more ceramic composite materials, graphite, thermally insulating materials, sealing or gasketing materials, and/or low resistance metals to form one or more different regions of the component. By using additive manufacturing methods to form a component of a high pressure press, the component may be designed to have a selected material property that is varied and/or uniform along one or more directions of the component, where the selected material property design may be selected to provide certain features that are useful during high pressure pressing. The component may be made by additive manufacturing methods to have the selected material property design throughout. For example, a method of manufacturing a component may include designing the component to have a selected material property varied along at least one direction of the component for use in a high pressure press, and then successively depositing a volume of one or more materials using a deposition device to build a three dimensional body of the component having the selected material property design. A selected material property that may be controllably varied or uniform along one or more directions of a component may include, for example, density, thermal conductivity and/or electrical conductivity, to name a few.

Other material characteristics, such as material composition, may be varied to provide increased resistivity. For example, the material composition of a resistance heating element may be designed to have a resistivity of at least about 10 microohm·m or at least about 12 microohm·m in some embodiments. Using a material composition having increased resistivity may provide an increased temperature gradient through the reaction cell.

Referring again to FIG. 2, a method for sintering two cutting elements within a reaction cell 200 may include providing a HPHT press and a reaction cell having a resistance heating element 210. A tool material 240 is loaded into the resistance heating element 210. In the embodiment shown, a barrier material may also be loaded into the resistance heating element 210, disposed between the ultra hard material layers 244 forming each sintered cutting element, where the barrier material may include material that prevents the attachment of the two ultra hard material layers 244 during sintering, such as pressure transmitting material. In other embodiments, for example shown in FIG. 3 having tool material for forming one sintered cutting element, the tool material 340 may be loaded into the resistance heating element 310 as a single continuous region or volume. The resistance heating element 210 may then be heated by passing a current through the resistance heating element 210. In the embodiment shown, a current is passed through the resistance heating element 210 at a first axial portion 250, heating the axial portion 250 to a control temperature. A temperature difference is measured between the control temperature along the first axial portion 250 and a second temperature measured at a distal axial portion 260 along the resistance heating element 210. Using resistance heating elements according to embodiments of the present disclosure may provide a more uniform temperature gradient throughout the heating element. For example, the difference between the second temperature at the distal axial portion 260 and the first temperature at axial portion 250 may have a standard deviation of less than about 10 percent between runs.

In the embodiment shown in FIG. 2, the first axial portion 250 heated to a control temperature is at a central position along the axial dimension of the heating element 210, where two temperature gradients may be formed from the central position to each axial end of the heating element 210. A first temperature gradient may be formed between the first axial portion 250 and a first axial end 260, where the first axial portion 250 is heated to a temperature greater than the first axial end 260, and a second temperature gradient may be formed between the first axial portion 250 and a second axial end 262, where the first axial portion 250 is heated to a temperature greater than the second axial end 262. In some embodiments, the first axial end 260 and the second axial end 262 may be heated to the same or close to the same temperature, e.g., within about 20 degrees Celsius difference. In some embodiments, a first axial end and second (or opposite) axial end of a heating element may be heated to different temperatures, e.g., greater than about 20 degrees Celsius difference.

In the embodiment shown in FIG. 3, a first axial portion 350 located at or near one axial end of the resistance heating element 310 may be heated to a control temperature, and the opposite axial end 360 of the resistance heating element 310 may be heated to a second temperature lower than the control temperature, such that a temperature gradient is formed along the axial dimension of the resistance heating element 310.

According to embodiments of the present disclosure, a first axial portion of a resistance heating element heated to a control temperature may correspond with the position of ultra hard tool material loaded into the resistance heating element for sintering. For example, in the embodiment shown in FIG. 2, the first axial portion 250 corresponds with the position of ultra hard material 244 such as diamond powder loaded into the resistance heating element 210 used to form two diamond layers of a sintered cutting element. A temperature gradient is formed axially along the tool material 240 such that the tool material forming the substrates 242 of the sintered cutting elements are heated to temperatures less than the ultra hard materials 244.

Figure 4:
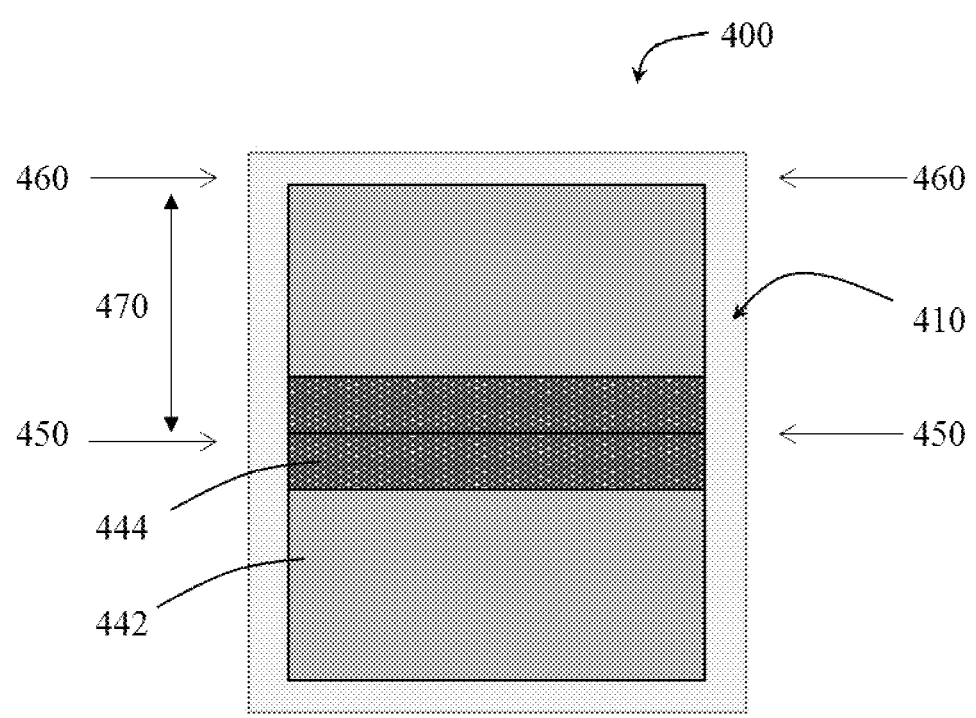
FIG. 4 is a cross sectional view of a HPHT cell assembly according to embodiments of the present disclosure.

FIG. 4 shows another example of a reaction cell assembly 400 having a tool material, including ultra hard material 444 and substrate material 442, loaded into a resistance heating element 410 for forming two sintered cutting elements, where a barrier material may be disposed between the two ultra hard material layers 444 to prevent the attachment of the ultra hard material layers during sintering. A first axial portion 450 of the resistance heating element 410 may be heated to a control temperature, and a distal axial portion 460 located at an axial end of the resistance heating element 410 may be heated to a second temperature less than the control temperature, such that a temperature difference 470 (or gradient) is measured between the control temperature and the second temperature. According to some embodiments of the present disclosure, the temperature difference 470 may range between about 4 percent to about 12 percent of the control temperature, from about 5 percent to about 11 percent of the control temperature, or from about 7 percent to about 10 percent of the control temperature. In some embodiments, the temperature difference may be greater than 100 degrees Celsius. The temperature difference may depend on, for example, the control temperature, the axial length of the heating element, and the material composition of the resistance heating element, including for example, the resistivity of the resistance heating element material and the uniformity of the resistance heating element material composition (e.g., uniform or monomodal grain size distribution, substantially uniform mixture of more than one element forming the material composition in resistance heating elements formed of more than one material, and substantially uniform distribution of any porosity in the resistance heating element).

Further, according to embodiments of the present disclosure, the temperature difference 470 may be substantially uniform around the perimeter of the resistance heating element 410. For example, the standard deviation of the second temperature at the distal axial portion 460 may be within 15 degrees Celsius. Increased uniformity in temperature along each axial position of the resistance heating element may result in more uniform heating of the tool material being sintered and thus also a more uniform distribution of a binder material used to sinter together the tool material.

For example, referring again to the reaction cell assembly shown in FIG. 4, three reaction cell assemblies were provided using different material compositions for each resistance heating element 410 of the three reaction cell assemblies. In a first reaction cell assembly setup, the HPHT cell had an average resistance of about 6.4 milliohms, a first axial portion 450 was heated to a control temperature of 1470 degrees Celsius, and a distal axial portion 460 at an axial end of the heating element 410 was heated to a second temperature, averaging 1355 degrees Celsius. The temperature difference 470 between the control temperature and the second temperature ranged between 100 and 130 degrees Celsius, having a standard deviation within 15 degrees Celsius between runs. In a second reaction cell assembly setup, the HPHT cell had an average resistance of about 6.2 milliohms, a first axial portion 450 was heated to a control temperature of 1470 degrees Celsius, and a distal axial portion 460 at an axial end of the heating element 410 was heated to a second temperature, averaging 1350 degrees Celsius. The temperature difference 470 between the control temperature and the second temperature ranged between 100 and 150 degrees Celsius, having a standard deviation within 25 degrees Celsius between runs. The increased temperature difference variation may be from a more uneven material composition (e.g., multimodal grain size distribution, uneven porosity distribution, variances formed during formation of the resistance heating element) than the one used in the first reaction cell assembly setup. In a third reaction cell assembly setup, the HPHT cell had an average resistance of about 5.7 milliohms, a first axial portion 450 was heated to a control temperature of 1470 degrees Celsius, and a distal axial portion 460 at an axial end of the heating element 410 was heated to a second temperature, averaging 1385 degrees Celsius. The temperature difference 470 between the control temperature and the second temperature ranged between 45 and 130 degrees Celsius, having a standard deviation within 43 degrees Celsius between runs. Thus, the third reaction cell assembly had a lower temperature difference 470, but a greater variation in the temperature difference, than the first and second reaction cell assemblies. The first reaction cell assembly demonstrated greater uniformity in binder material distribution through the tool material being sintered than in the second and third reaction cell assemblies.

Figure 5:
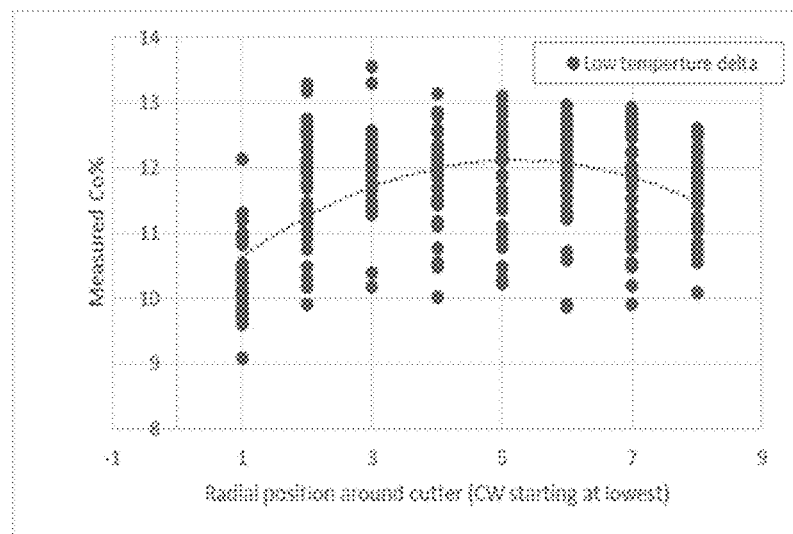
FIG. 5 shows a graph of the results for binder distribution around the perimeter of a sintered cutting element.
Figure 6:
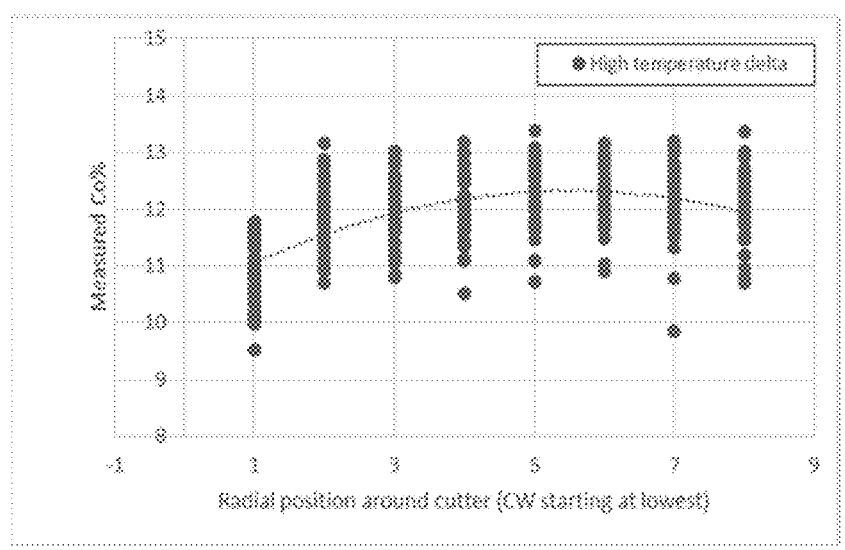
FIG. 6 shows a graph of the results for binder distribution around the perimeter of a sintered cutting element according to embodiments of the present disclosure.

FIGS. 5 and 6 show comparative results from cutting elements sintered using different resistance heating elements. In FIG. 5, cutting elements were sintered using resistance heating elements having an axial temperature difference formed between a control temperature at a first axial portion of the heating element and a second temperature at an axial end portion of the heating element, where the average temperature difference was less than 100 degrees Celsius and where the temperature difference varied by more than 15 percent of the average temperature difference. Forty cutting elements, each cutting element including a sintered polycrystalline diamond body having a cobalt binder distributed between bonded together diamond grains, were sintered for the data collection shown in FIG. 5. The volume percent of binder was measured at eight evenly spaced positions around the perimeter of each cutting element. As shown in FIG. 5, the percent by volume of cobalt binder varied around the perimeter of the sintered diamond body.

In FIG. 6, cutting elements were sintered using resistance heating elements according to embodiments of the present disclosure having an axial temperature difference formed between a control temperature at a first axial portion of the heating element and a second temperature at an axial end portion of the heating element, where the average temperature difference was greater than 100 degrees Celsius and where the temperature difference varied by less than 10 percent of the average temperature difference. Forty cutting elements, each cutting element including a sintered polycrystalline diamond body having a cobalt binder distributed between bonded together diamond grains, were sintered for the data collection shown in FIG. 6. The volume percent of binder was measured at eight evenly spaced positions around the perimeter of each cutting element. As shown in FIG. 6, the cobalt binder was distributed more uniformly around the perimeter of the sintered diamond body than in the sintered bodies of FIG. 5.

According to embodiments of the present disclosure, a sintered cutting tool body may include a binder phase substantially uniformly distributed among a plurality of bonded together ultra hard material grains, such that the volume percent of the binder phase measured around the perimeter of the sintered body varies within 15 percent of the average volume percent of the binder phase. Sintered cutting tool bodies disclosed herein may refer to, for example, ultra hard material bodies, such as polycrystalline diamond bodies and cubic boron nitride bodies, with or without a substrate bonded thereto during the sintering process.

Increased uniformity in an axial temperature drop along a resistance heating element may also result in more uniform distribution of residual material from a refractory metal can, barrier or heating element used for sintering tool material in a reaction cell. For example, according to some embodiments of the present disclosure, residual material from a resistance heating element or from a refractory metal material used in the HPHT reaction cell may migrate into the tool material being sintered substantially uniformly around the perimeter of the tool material. Refractory metal material may be used in a resistance heating element (e.g., a resistance heating element formed of a refractory metal and graphite composite), may be coated around the inner surface of the resistance heating element, or may be provided as a refractory metal sheet or refractory metal can between the resistance heating element and the tool material being sintered.

Upon sintering the tool material, a residual material may be substantially uniformly distributed around the outer perimeter of the sintered body. For example, in embodiments having a sintered ultra hard material body, such as a polycrystalline diamond body, a residual material may be substantially uniformly distributed around the outer perimeter of the ultra hard material body. The residual material may include a refractory metal and/or a refractory metal carbide. Further, the residual material may extend a depth into a sintered body from its outer perimeter. The depth may be substantially uniform around the perimeter of the sintered body, or in some embodiments, the depth may vary within about 5 percent of an average depth around the perimeter, the depth may vary within about 15 percent of an average depth around the perimeter in some embodiments, or the depth may vary within about 25 percent of an average depth around the perimeter in some embodiments.

Figure 7:
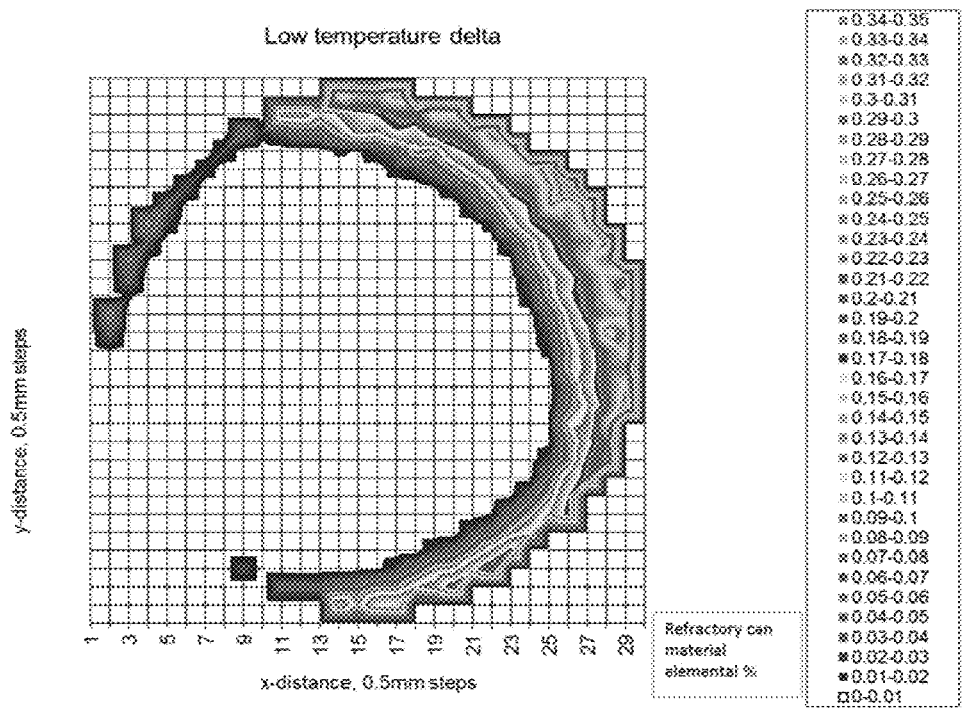
FIG. 7 shows the residual material distribution around the outer perimeter of a sintered cutting element.
Figure 8:
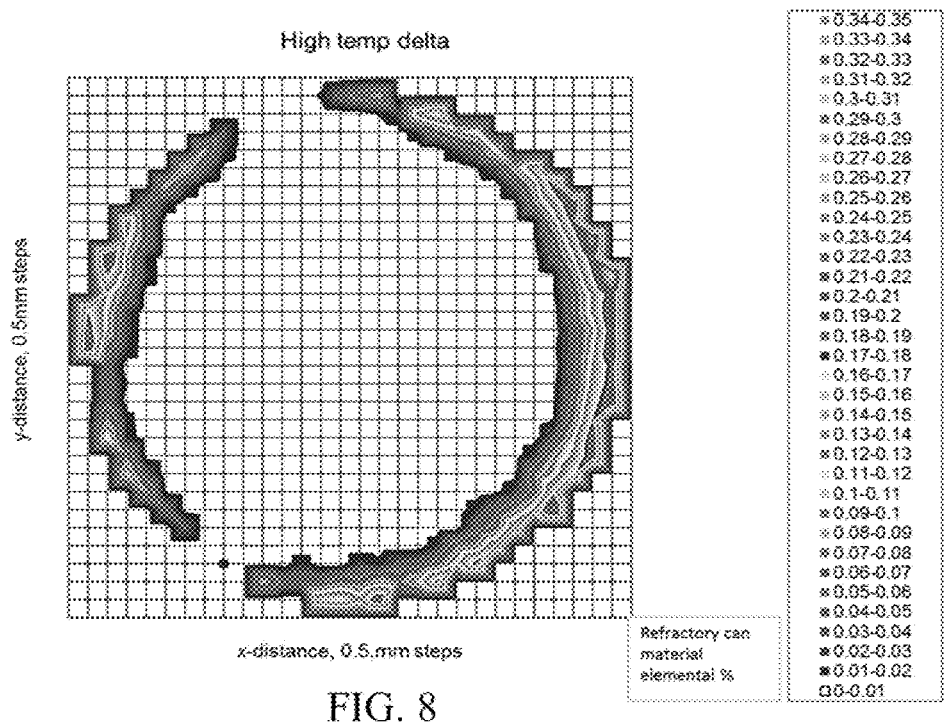
FIG. 8 shows the residual material distribution around the outer perimeter of a sintered cutting element according to embodiments of the present disclosure.

FIGS. 7 and 8 show comparative examples of residual material distribution around the outer perimeter of a sintered body formed according to embodiments of the present disclosure (FIG. 8) and residual material distributed around the outer perimeter of a sintered body that was sintered in a reaction cell having a lower temperature difference and greater temperature difference variability (FIG. 7). Particularly, cylindrical sintered bodies were sintered in two different reaction cell assemblies, where FIGS. 7 and 8 show the distribution of residual material around the circumference of the sintered bodies and the depth the residual material extends into the sintered bodies from the outer perimeter, measured as elemental percentages.

The sintering process used to form the sintered body of FIG. 7 included a resistance heating element being heated to a control temperature at a first axial portion of the heating element and to a second temperature at a distal axial end of the heating element, where the temperature difference between the control temperature and the second temperature was less than 5 percent of the control temperature, and a refractory metal can disposed between the resistance heating element and the tool material being sintered to form the sintered body. Refractory metal from the refractory metal can migrated into the sintered body around a portion of its outer perimeter and extended a varying depth into the sintered body. As shown, approximately 75 to 80 percent of the outer perimeter included residual material from the refractory metal can (within the limits of detection). The portion of the outer perimeter having the largest elemental percent of refractory can material includes between 0.01 and 0.35 percent of refractory can material extending a depth of about 3.5 mm from the outer perimeter, or in other words, extending a depth of about 23 percent of the sintered body diameter.

The sintering process used to form the sintered body of FIG. 8 included a resistance heating element being heated to a control temperature at a first axial portion of the heating element and to a second temperature at a distal axial end of the heating element, where the temperature difference between the control temperature and the second temperature was between 6 and 11 percent of the control temperature, and a refractory metal can disposed between the resistance heating element and the tool material being sintered to form the sintered body. As shown, approximately 90 percent of the outer perimeter included residual material from the refractory metal can (within the limits of detection). However, in other embodiments according to the present disclosure, greater than 90 percent and greater than 95 percent of an outer perimeter of a sintered body may have residual material from a refractory can used during the sintering process. Further, the portion of the outer perimeter having the largest elemental percent of refractory can material includes between 0.01 and 0.25 percent of refractory can material extending a depth of about 2 mm from the outer perimeter, or in other words, extending a depth of about 13 percent of the sintered body diameter. According to embodiments of the present disclosure, the outer perimeter of a sintered body formed using the sintering processes disclosed herein may include residual material extending a depth from the outer perimeter ranging from greater than 0 to less than about 15 percent of the sintered body diameter. Further, greater than 90 percent or greater than 95 percent of an outer perimeter of a sintered body may have residual material from a refractory can used during the sintering process, where the depth of the residual material extending from the outer perimeter may range from greater than 0 to less than about 15 percent of the sintered body diameter.

Increased uniformity of the material used to form a resistance heating element may also result in a more uniform maximum axial voltage drop along the resistance heating element. For example, during a sintering process having a first axial portion of a resistance heating element heated to a control temperature, the voltage drop along an axial dimension of the resistance heating element may vary by less than 5 percent around the perimeter of the resistance heating element.

Figure 10:
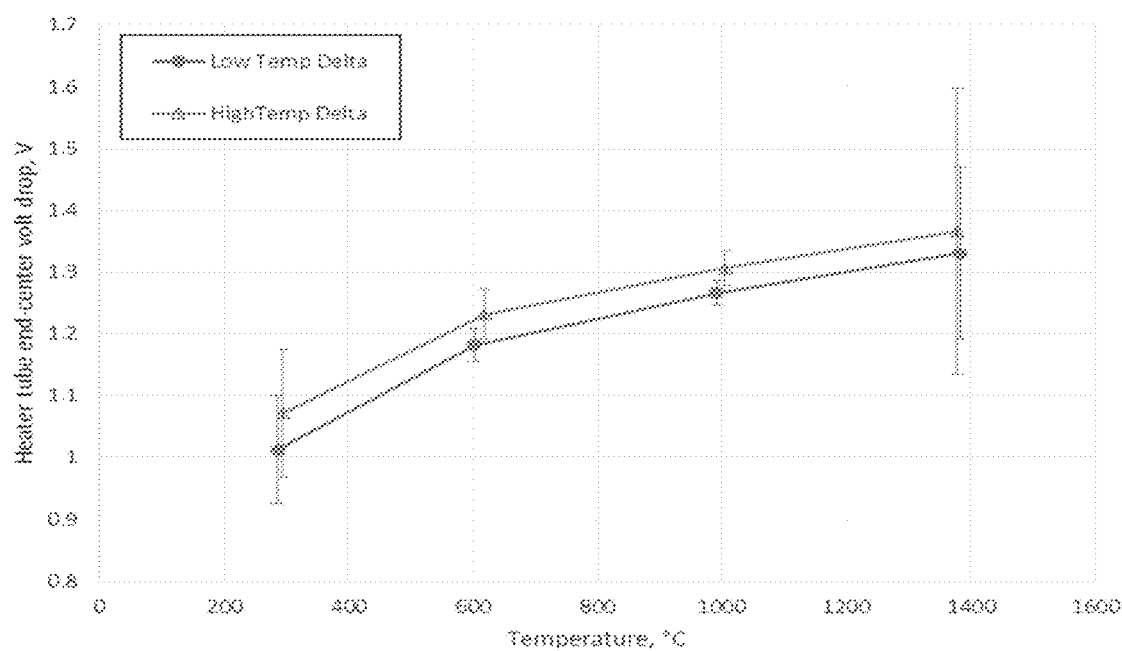
FIG. 10 shows a graph of the voltage drop along an axial dimension of resistance heating elements.

FIG. 10 shows a graph of voltage drop results in graphite resistance heating elements having a low temperature difference and a high temperature difference between a control temperature at a first axial portion of the resistance heating element and a second temperature at an axial end of the resistance heating element distal from the first axial portion, where the low temperature difference is less than 5 percent of the control temperature and the high temperature difference is between 6 and 12 percent of the control temperature. As shown, the resistance heating element having a high temperature difference also has a greater voltage drop measured between the first axial portion and the axial end of the resistance heating element than the low temperature difference heating element.

Figure 11:
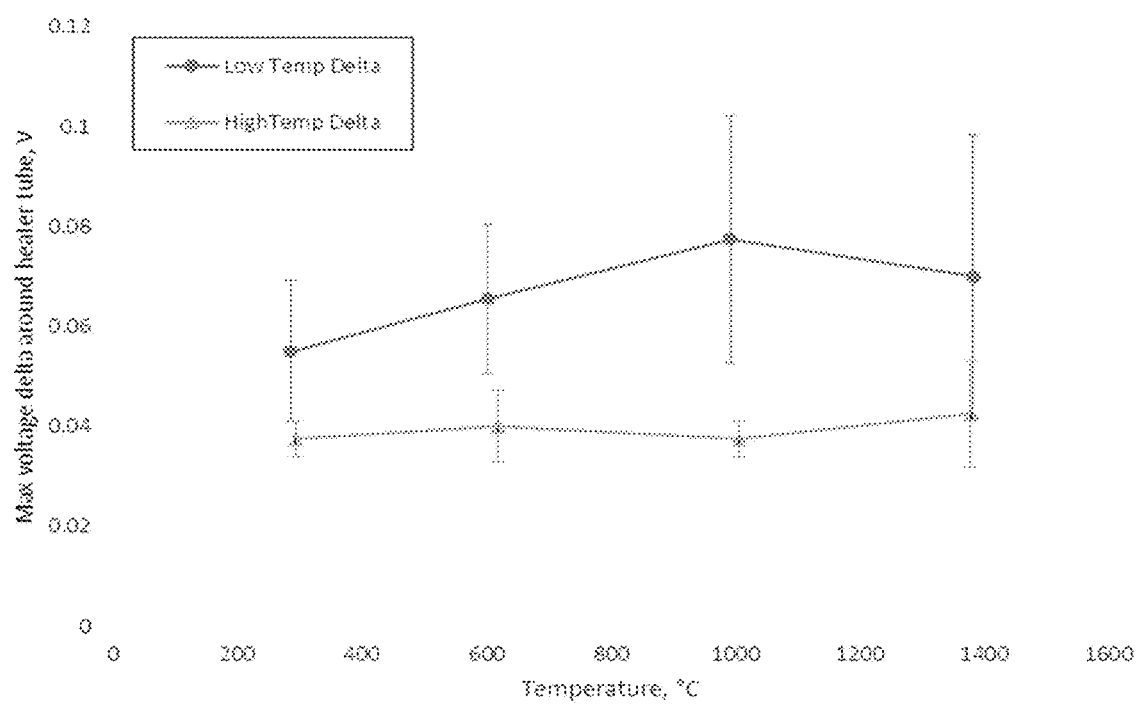
FIG. 11 shows a graph of the variance in the maximum voltage drop along an axial dimension of resistance heating elements around their perimeters.

FIG. 11 shows a graph of the variance in the maximum voltage drop around the perimeter surface of the low temperature difference and high temperature difference resistance heating elements around each of their perimeters. As shown, the high temperature difference resistance heating element may vary less around its outer perimeter than the low temperature difference resistance heating element. For example, when the low temperature difference resistance heating element is heated to 1,000 degrees Celsius, the maximum voltage drop around its outer perimeter may vary between about 0.05 V and about 0.1 V, whereas the high temperature difference resistance heating element having a maximum voltage drop around its outer perimeter vary between about 0.035 V and about 0.04 V when heated to 1,000 degrees Celsius. According to some embodiments, a high temperature difference resistance heating element, having a temperature difference between a control temperature at a first axial portion of the heating element and a second temperature at an axial end of the heating element distal from the first axial portion ranging from about 5 to about 12 percent of the control temperature, may also have a maximum voltage drop along an axial dimension of the resistance heating element that varies by less than 15 percent, less than 10 percent, or less than 5 percent around the perimeter of the resistance heating element.

By using a reaction cell component with a designed material resistivity and dimensions, a desired temperature gradient having increased uniformity may be formed in the reaction cell during high pressure high temperature sintering. Increased uniformity of the temperature gradient may provide more uniform heating and thus also a more uniform material composition of the tool material being sintered. Sintering processes disclosed herein may be used to form a cutting element or other component of a downhole cutting tool, e.g., a polycrystalline diamond (PCD) cutting element having a PCD body attached to a substrate, a thermally stable diamond (TSP) element with or without a substrate attached thereto, or other ultra hard material bodies with or without a substrate attached thereto.

For example, a cutting element according to embodiments of the present disclosure may include a substrate and an ultra hard material body bonded to the substrate. The ultra hard material body may have a plurality of bonded together ultra hard material grains, for example, bonded together diamond grains or grains of cubic boron nitride, and a binder phase substantially uniformly distributed among the plurality of bonded together ultra hard material grains. A substantially uniform distribution of binder phase may refer to a standard deviation of less than 15 percent from the average volume percent of the binder phase present within the ultra hard material body. For example, according to some embodiments, a volume percent of a binder phase measured around the perimeter of an ultra hard material body varies within 15 percent of the average volume percent of the binder phase present in the entire ultra hard material body.

Figure 9:
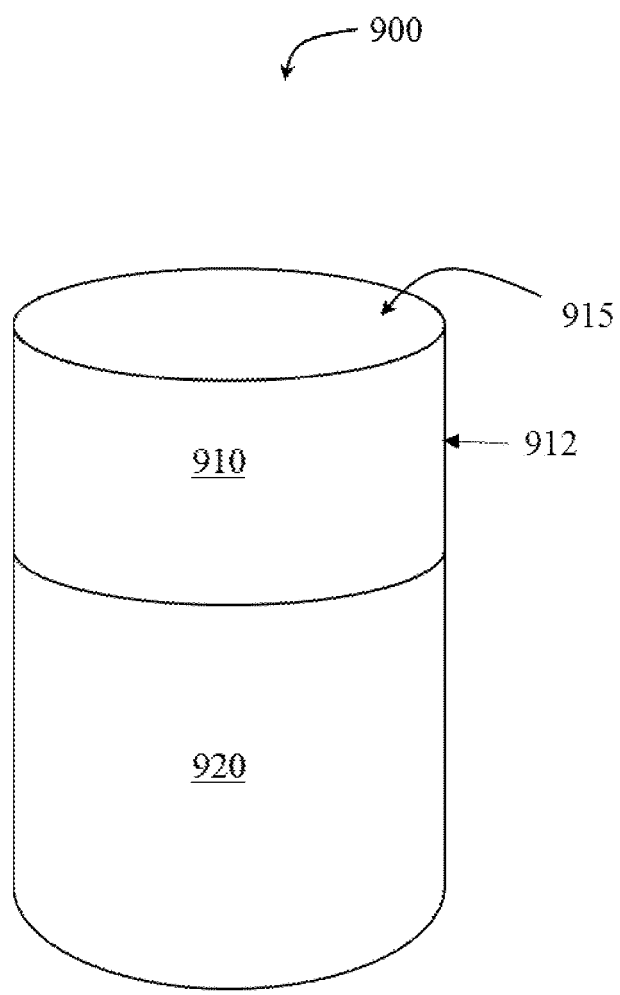
FIG. 9 shows a cutting element according to embodiments of the present disclosure.

FIG. 9 shows an example of a cutting element 900 according to embodiments of the present disclosure. The cutting element 900 has an ultra hard material body 910 disposed on a substrate 920 at an interface, which may be a planar or non-planar interface. The ultra hard material body 910 has a cutting face 915 opposite the interface and an outer perimeter 912. For example, the ultra hard material body 910 may be a polycrystalline diamond body having bonded together diamond grains and a binder phase substantially uniformly distributed among the plurality of bonded together diamond grains, and the substrate 920 may be a transition metal carbide, e.g., tungsten carbide, or a carbide composite. According to embodiments of the present disclosure, an ultra hard material body may have an average volume percent of the binder phase ranging from a lower limit selected from 5, 8 and 10 percent to an upper limit selected from 8, 10, 13 and 16 percent, where any lower limit may be used in combination with any upper limit. The binder phase may be substantially uniformly distributed through the ultra hard material body 910 such that the volume percent of the binder phase measured around the outer perimeter 912 of the ultra hard material body varies within 15 percent of the average volume percent of the binder phase along an axial portion of the ultra hard material body 910. For example, the volume percent of the binder phase measured around the outer perimeter 912 of the ultra hard material body along the cutting face 915 varies within 15 percent of the average volume percent of the binder phase at the axial end (the cutting face) of the ultra hard material body 910. Likewise, the volume percent of the binder phase measured around the outer perimeter 912 of the ultra hard material body along an axial portion of the ultra hard material body at a depth from the cutting face 915 varies within 15 percent of the average volume percent of the binder phase at the axial portion of the ultra hard material body 910.

The cutting element 900 may also have a residual material substantially uniformly distributed around the outer perimeter 912 of the ultra hard material body 910. The residual material may include a refractory metal or a refractory metal carbide. The residual material may extend a depth into the ultra hard material body 910 from the outer perimeter 912, where the depth may vary by less than 10 percent of the cutting element diameter, less than 5 percent of the cutting element diameter, and less than 2 percent of the cutting element diameter in some embodiments.

The cutting element 900 shown in FIG. 9 may be formed using sintering processes disclosed herein. For example, the cutting element 900 may be formed by loading a tool material to be sintered into a reaction cell of a HPHT press, the reaction cell having a resistance heating element made with a fine grained and uniform material composition. The tool material to be sintered may include a layer of carbide material to form the substrate 920 and a layer of diamond powder to form the ultra hard material body 910 disposed over the carbide material. After the tool material is loaded within the resistance heating element, a current may be passed through the resistance heating element to heat the resistance heating element and the enclosed tool material. Pressure may also be applied during heating. During heating, a first axial portion of the resistance heating element may be heated to a control temperature, while a distal axial portion at an axial end of the resistance heating element may be heated to a second temperature lower than the control temperature, thereby creating a temperature gradient along the axial dimension of the resistance heating element. A temperature difference between the control temperature and the second temperature may be between 6 and 11 percent of the control temperature in some embodiments, or between 8 and 12 percent of the control temperature in some embodiments, depending on, for example, the size of the cutting element being sintered. The fine grain size and uniformity of the material composition forming the resistance heating element may provide a more uniform temperature gradient along its axial dimension, such that the second temperature at the axial end of the resistance heating element may vary by less than 10 percent.

Figure 13:
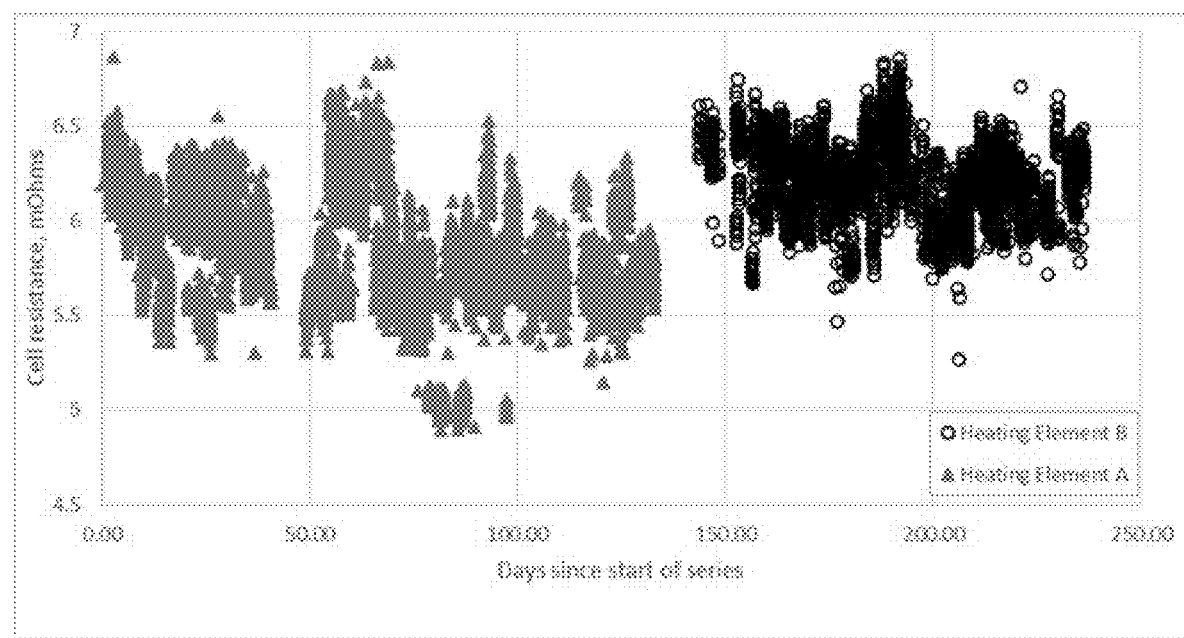
FIG. 13 shows a graph illustrating the reduced variance in resistance of heater tubes associated with the present disclosure.

FIG. 13 shows comparative results from multiple successive sintering processes using different resistance heating elements. The successive runs are plotted over time. Initially, a conventional resistive heating element (heating element A) having a non-uniform grain size (and thus, non-desirable temperature differential outside of the scope of the present disclosure) was used to sinter cutting elements and the cell resistance was measured and plotted for each run until day 132. At around day 136, a resistive heating element (heating element B) having a substantially uniform and fine grain size (and a temperature difference between the control temperature and the second temperature between 6 and 11 percent of the control temperature) was used in successive runes to sinter cutting elements. The cell resistance was measured and plotted for each run, as shown in FIG. 13. The vertical spread or distribution of the measured cell resistance is less (and with fewer outliers) for heating element B than the heating element A, thus indicating greater heating uniformity and less deviation between runs for heating element B than heating element A. The lot-to-lot variation between different batches of heater tubes was also smaller for heating element B compared with heating element A.

Figure 12:
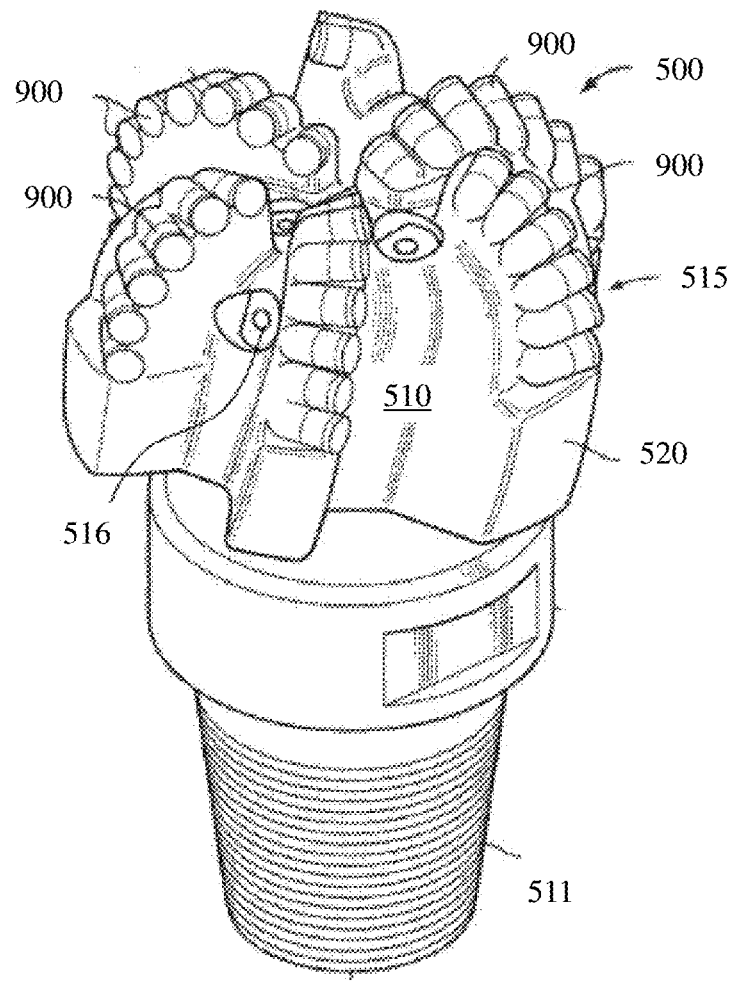
FIG. 12 shows a drill bit according to embodiments of the present disclosure.

Cutting elements according to embodiments of the present disclosure may be used on downhole cutting tools, such as drill bits and reamers. For example, FIG. 12 shows an example of a fixed cutter drill bit having at least one cutting element according to embodiments of the present disclosure, such as cutting element 900, described above. As shown, the drill bit 500 includes a bit body 510 having a threaded upper pin end 511 and a cutting end 515. The cutting end 515 may include a plurality of ribs or blades 520 arranged about the rotational axis (also referred to as the longitudinal or central axis) of the drill bit and extending radially outward from the bit body 510. Cutting elements, including cutting elements 900, are embedded in the blades 520 at predetermined angular orientations and radial locations and with a desired back rake angle and side rake angle against a formation to be drilled. Such cutting elements may include shear cutters with planar or substantially planar upper surfaces as well as cutting elements having non-planar cutting ends, such as a substantially pointed cutting end.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for sintering, comprising:
   loading a tool material into a non-uniform resistance heating element having a variation in one or more dimensions and/or one or more material properties within a HPHT press; and
   heating the resistance heating element at a first axial portion to a control temperature, where a temperature difference is measured between the control temperature and a second temperature measured at a distal axial portion along the resistance heating element, wherein a difference between the control temperature and the second temperature ranges between about 5 percent to about 11 percent of the control temperature.

2. The method of claim 1, further comprising:
   designing a reaction cell of the HPHT press to have a varied distribution of heat along an axial dimension, the reaction cell comprising the resistance heating element.

3. The method of claim 2, wherein the reaction cell further comprises at least one end disk disposed at an axial end of the resistance heating element.

4. The method of claim 1, wherein the standard deviation of the second temperature at the distal axial portion is within 10 degrees Celsius.

5. The method of claim 1, wherein the HPHT press further comprises pressure transmitting material disposed between the resistance heating element and the tool material.

6. The method of claim 1, wherein the temperature difference is greater than 100 degrees.

7. The method of claim 1, wherein the resistance heating element comprises graphite having a fine grain size ranging from about 5 micrometers to about 30 micrometers.

8. The method of claim 7, wherein the graphite has a substantially monomodal grain size distribution.

9. The method of claim 1, wherein the resistance heating element comprises a material with a resistivity of greater than 8 microohm·m.

10. The method of claim 1, wherein the tool material comprises at least one layer of carbide material and at least one layer of diamond powder disposed on the at least one layer of carbide material, and wherein after the heating, at least one cutting element is formed from the tool material, each cutting element having a polycrystalline diamond layer attached to a carbide substrate.

11. The method of claim 10, wherein the polycrystalline diamond layer comprises a binder phase substantially uniformly distributed among a plurality of diamond grains, such that the volume percent of the binder phase measured around the perimeter of the polycrystalline diamond layer varies within 15 percent of the average volume percent of the binder phase around the perimeter.

12. The method of claim 1, wherein during heating, material from a refractory can enclosing the tool material migrates into the tool material substantially uniformly around the perimeter of the tool material.

13. The method of claim 1, wherein at the control temperature, a maximum voltage drop along an axial dimension of the resistance heating element varies by less than 5 percent around the perimeter of the resistance heating element.

14. The method of claim 1, wherein the one or more material properties varies along at least one direction of the resistance heating element.

15. The method of claim 1, wherein the one or more dimensions is wall thickness and/or width.

16. The method of claim 1, wherein the one or more material properties is grain size, density, thermal conductivity, electrical conductivity, material composition, and/or electrical resistivity.

17. The method of claim 1, wherein the one or more dimensions and/or the one or more material properties varies along an axial dimension of the resistance heating element.

18. The method of claim 1, wherein the temperature difference is generated by varying the one or more material properties along at least one direction of the resistance heating element, and wherein the one or more material properties is grain size, density, thermal conductivity, electrical conductivity, material composition, and/or electrical resistivity.

19. The method of claim 1, wherein the tool material comprises a carbide substrate assembled with a ultra-hard material, wherein during the heating, the carbide substrate is sintered to the ultra-hard material.

* * * * *